US010741856B2

(12) United States Patent
O'Neill et al.

(10) Patent No.: US 10,741,856 B2
(45) Date of Patent: Aug. 11, 2020

(54) FUEL CELL COOLANT FLOWFIELD CONFIGURATION

(75) Inventors: Jonathan Daniel O'Neill, Manchester, CT (US); Sushant S. Bhadange, Vernon, CT (US)

(73) Assignee: AUDI AG, Ingolstadt (DE)

( * ) Notice: Subject to any disclaimer, the term of this patent is extended or adjusted under 35 U.S.C. 154(b) by 740 days.

(21) Appl. No.: 14/414,862

(22) PCT Filed: Jul. 20, 2012

(86) PCT No.: PCT/US2012/047509
§ 371 (c)(1),
(2), (4) Date: Jan. 14, 2015

(87) PCT Pub. No.: WO2014/014471
PCT Pub. Date: Jan. 23, 2014

(65) Prior Publication Data
US 2015/0221962 A1    Aug. 6, 2015

(51) Int. Cl.
*H01M 8/04* (2016.01)
*H01M 8/04007* (2016.01)
(Continued)

(52) U.S. Cl.
CPC ..... *H01M 8/04074* (2013.01); *H01M 8/0263* (2013.01); *H01M 8/0267* (2013.01); *H01M 8/04134* (2013.01); *H01M 2008/1095* (2013.01)

(58) Field of Classification Search
CPC ........... H01M 8/0263; H01M 8/04074; H01M 8/241; H01M 8/0267; H01M 8/0258; H01M 8/04134; H01M 2008/1095
(Continued)

(56) References Cited

U.S. PATENT DOCUMENTS 5,942,347 A * 8/1999 Koncar ................. H01M 8/023
264/105
6,322,915 B1   11/2001 Collins et al.
(Continued)

FOREIGN PATENT DOCUMENTS

DE    203 15 716 U1    1/2004
JP    2003-505824 A    2/2003
(Continued)

OTHER PUBLICATIONS

PCT International Search Report dated Mar. 28, 2013 for PCT Application No. PCT/US2012/047509 (3 pages).
(Continued)

*Primary Examiner* — Stewart A Fraser
*Assistant Examiner* — Claire L Roe
(74) *Attorney, Agent, or Firm* — Seed Intellectual Property Law Group LLP

(57) ABSTRACT

An exemplary method of cooling a fuel cell includes directing coolant through a coolant supply channel near at least one reactant flow channel. The coolant supply channel extends from a coolant inlet spaced from a reactant inlet to a coolant outlet. The coolant supply channel includes a first portion starting at the coolant inlet and a second portion near the reactant inlet. The first portion facilitates coolant flow from the coolant inlet directly toward the second portion. The second portion includes a plurality of channel sections that collectively facilitate coolant flow in a plurality of directions along the second portion near the reactant inlet. The coolant supply channel includes a third portion between the second portion and the coolant outlet.

9 Claims, 3 Drawing Sheets

(51) Int. Cl.
  *H01M 8/0263* (2016.01)
  *H01M 8/0267* (2016.01)
  *H01M 8/1018* (2016.01)
  *H01M 8/04119* (2016.01)

(58) Field of Classification Search
  USPC .......................................................... 429/434
  See application file for complete search history.

(56) References Cited

U.S. PATENT DOCUMENTS

| | | | |
|---|---|---|---|
| 6,500,579 B1 * | 12/2002 | Maeda | H01M 8/0228 |
| | | | 429/454 |
| 6,858,337 B2 | 2/2005 | Reiser | |
| 6,869,709 B2 | 3/2005 | Shimotori et al. | |
| 7,407,723 B2 | 8/2008 | Kusakabe et al. | |
| 2001/0004501 A1 | 6/2001 | Yi et al. | |
| 2002/0182471 A1 | 12/2002 | Kralick | |
| 2004/0023102 A1 | 2/2004 | Sugita et al. | |
| 2004/0126629 A1 | 7/2004 | Reiser | |
| 2004/0157103 A1 | 8/2004 | Takeguchi et al. | |
| 2006/0115710 A1 | 6/2006 | Kusakabe et al. | |
| 2008/0014486 A1 | 1/2008 | Unoki et al. | |

FOREIGN PATENT DOCUMENTS

| | | |
|---|---|---|
| JP | 2004-241230 A | 8/2004 |
| JP | 2006-509332 A | 3/2006 |
| JP | 2006-512733 A | 4/2006 |
| JP | 2008-525992 A | 7/2008 |
| JP | 2010-9754 A | 1/2010 |
| WO | 01/06588 A1 | 1/2001 |
| WO | 2005/074062 A1 | 8/2005 |
| WO | 2006/071593 A2 | 7/2006 |

OTHER PUBLICATIONS

Extended European Search Report, dated Feb. 5, 2016, for corresponding European Application No. 12881366.4-1360 / 2875545, 8 pages.

* cited by examiner

FUEL CELL COOLANT FLOWFIELD CONFIGURATION

STATEMENT REGARDING FEDERALLY SPONSORED RESEARCH OR DEVELOPMENT

This invention was made with government support under Contract No. CA-04-7003-00 awarded by the Department of Transportation/Federal Transit Agency. The Government therefore has certain rights in this invention.

BACKGROUND

Typical fuel cell arrangements include multiple fuel cells placed together in a cell stack assembly (CSA). Each fuel cell generally includes an anode, a cathode, and a membrane between the anode and the cathode. A cathode reactant, such as oxygen, and an anode reactant, such as hydrogen, are used in an electro-chemical reaction at the membrane to produce electrical energy.

CSA durability can be limited by a variety of decay mechanisms or factors. For example, voltage cycling may cause performance decay over time. Local membrane humidity cycling may cause the membrane to wear out. Both of these types of cycling may occur in response to changes in load or power demand. Another source of CSA decay is an elevated operating temperature. Higher operating temperatures tend to be associated with higher decay rates in CSA performance. A number of approaches have been taken to mitigate CSA decay caused by elevated operating temperatures.

SUMMARY

An exemplary fuel cell assembly includes a first electrode, a second electrode, and a membrane between the electrodes. A reactant distribution plate includes at least one reactant flow channel extending from a reactant inlet near an edge of the reactant distribution plate to an outlet. A coolant supply channel near the at least one reactant flow channel extends from a coolant inlet, which is spaced from the reactant inlet, to a coolant outlet. The coolant supply channel includes a first portion between the coolant inlet and a second portion near the reactant inlet. The first portion facilitates coolant flow from the coolant inlet directly toward the second portion. The second portion includes a plurality of channel sections that collectively facilitate coolant flow in a plurality of directions along the second portion near the reactant inlet. The coolant supply channel includes a third portion between the second portion and the coolant outlet.

An exemplary method of cooling a fuel cell includes directing coolant through a coolant supply channel near at least one reactant flow channel. The coolant supply channel extends from a coolant inlet spaced from a reactant inlet to a coolant outlet. The coolant supply channel includes a first portion between the coolant inlet and a second portion near the reactant inlet. The first portion facilitates coolant flow from the coolant inlet directly toward the second portion. The second portion includes a plurality of channel sections that collectively facilitate coolant flow in a plurality of directions along the second portion near the reactant inlet. The coolant supply channel includes a third portion between the second portion and the coolant outlet.

These and other features of disclosed examples can be understood from the following description and the accompanying drawings, which can be briefly described as follows.

DETAILED DESCRIPTION

Figure 1:
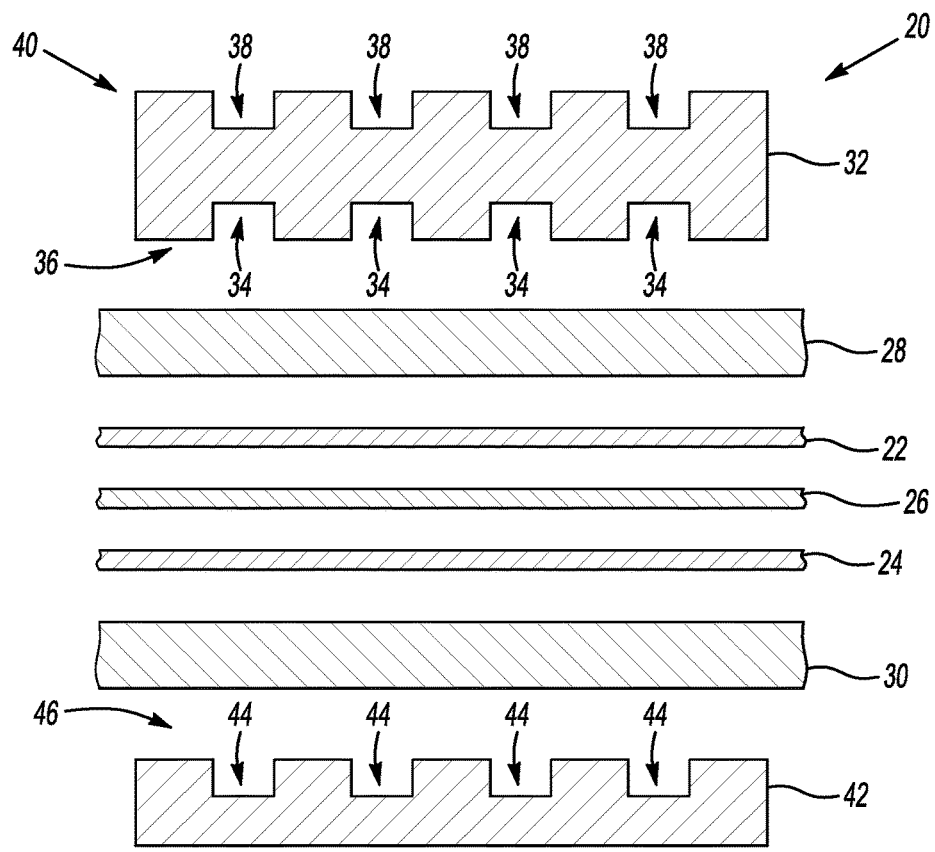
FIG. 1 illustrates a schematic view of selected components of an example fuel cell assembly.

FIG. 1 illustrates a schematic view of selected components of an example fuel cell assembly 20 including a first electrode 22, such as a cathode, a second electrode 24, such as an anode, and a membrane 26 located between the first electrode 22 and the second electrode 24. A first gas diffusion layer 28 is located adjacent the first electrode 22 and a second gas diffusion layer 30 is located adjacent the second electrode 24. The first and second gas diffusion layers 28, 30 are located on an opposite side of the first and second electrodes 22, 24, respectively, from the membrane 26.

An example first fluid distribution plate assembly 32 includes first reactant flow channels 34 located on a first side 36 of the first fluid distribution plate assembly 32 and coolant supply channels 38 located on a second, opposite side 40 of the first fluid distribution plate assembly 32. The first reactant flow channels 34 are located adjacent the first gas diffusion layer 28 and are configured to accept air or pure oxygen. The coolant supply channels 38 are configured to direct a coolant, such as water, to achieve a desired cooling effect in the fuel cell assembly 20.

In some examples, the first fluid distribution plate assembly 32 is micro-porous and hydrophilic.

A second fluid distribution plate assembly 42, such as a porous water transport plate, is located adjacent the second gas diffusion layer 30 on an opposite side of the second gas diffusion layer 30 from the second electrode 24. The second fluid distribution plate assembly 42 includes second reactant flow channels 44 located on a first side 46 and configured to distribute a fuel, such as hydrogen.

In this example, the second fluid distribution plate assembly 42 is micro-porous and hydrophilic.

Figure 2:
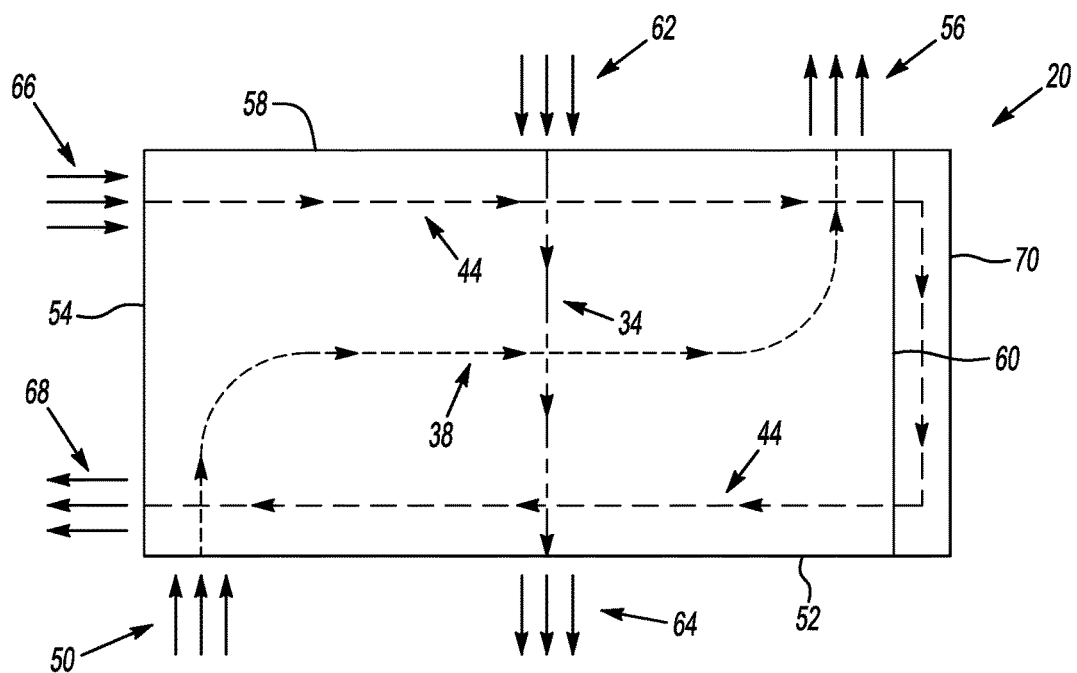
FIG. 2 illustrates a schematic view of an example fluid flow diagram.

FIG. 2 schematically illustrates an example fluid flow pattern or design for an embodiment of the fuel cell assembly 20. A coolant inlet region 50 is located along a first edge 52 near an intersection of the first edge 52 and a second edge 54 (e.g., near the corner of the plate) of the fuel cell assembly 20. In this example, the inlet region 50 leads into the channels 38 on the first fluid distribution plate assembly 32. The coolant inlet region 50 is in fluid communication with the coolant supply channels 38 and a coolant outlet region 56. The coolant outlet region 56 is located on a third edge 58 of the assembly 20 and in particular the edge 58 of the first fluid distribution plate assembly 32 near an intersection of the third edge 58 and a fourth edge 60.

A first reactant inlet region 62 is located along the third edge 58. The first reactant inlet region 62 is in fluid communication with the first reactant flow channels 34 (FIG. 1) and a first reactant outlet region 64 located adjacent the first edge 52. The first reactant inlet region 62 in this example is on an edge of the first fluid distribution plate assembly 32. The first reactant flows in a single pass pattern in this example.

A second reactant flows in a two-pass flow pattern in this example. A second reactant inlet region 66 is located on the second fluid distribution plate assembly 42 adjacent the second edge 54 and near an intersection of the second edge 54 and the third edge 58. The second reactant inlet region 66 is in fluid communication with the second reactant flow channels 44 and a second reactant outlet region 68. The second reactant outlet region 68 is located adjacent the second edge 54 of the first fluid distribution plate assembly 32 and near an intersection of the first edge 52 and the second edge 54. In this example, the second reactant flow channels 44 extend the length of the fuel cell assembly 20 to a manifold 70 along the edge 60. The manifold 70 directs the second reactant towards the second reactant outlet region 68, which is on the edge 54 in this example.

Figure 3:
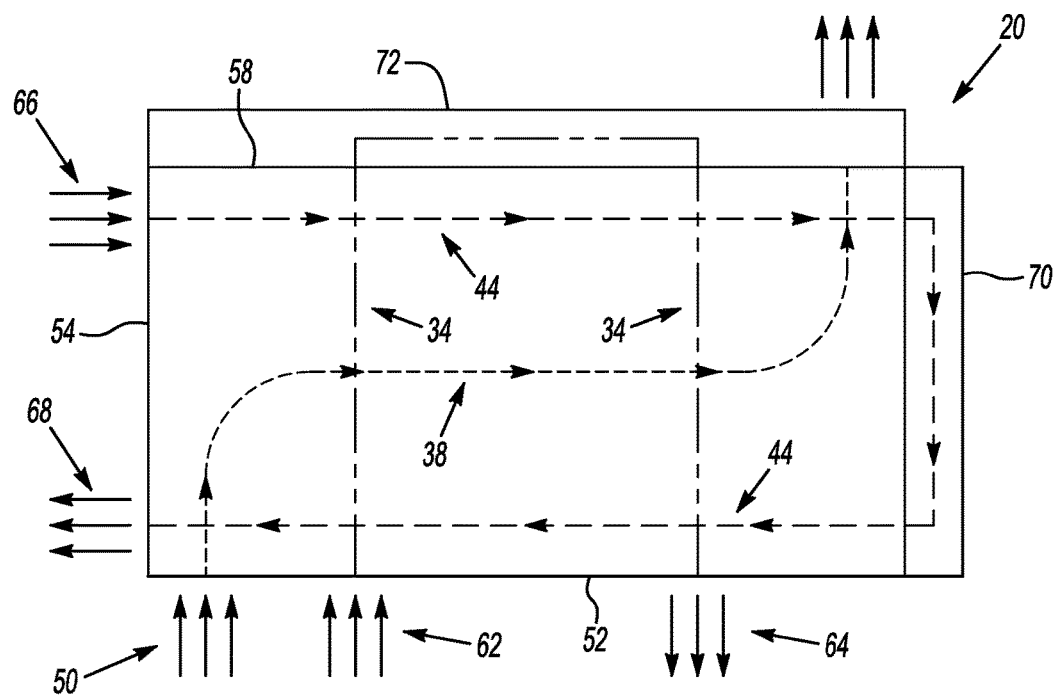
FIG. 3 illustrates another example schematic view of a fluid flow diagram

FIG. 3 illustrates a schematic view of another example fluid flow pattern or design for another embodiment of the fuel cell assembly 20, similar to the schematic view shown in FIG. 2. In FIG. 3 both reactants follow a two-pass path across the respective plates. The first reactant inlet region 62 and the coolant inlet region 50 are located along the first edge 52 of the first fluid distribution plate assembly 32. At least one of the first reactant flow channels 34 extends from the first reactant inlet region 62 along the first edge 52 to a manifold 72 located along the third edge 58. The first reactant is redirected by the manifold 72 from the third edge 58 through at least one more of the first reactant flow channels 34 to the first reactant outlet region 64 along the first edge 52.

Figure 4:
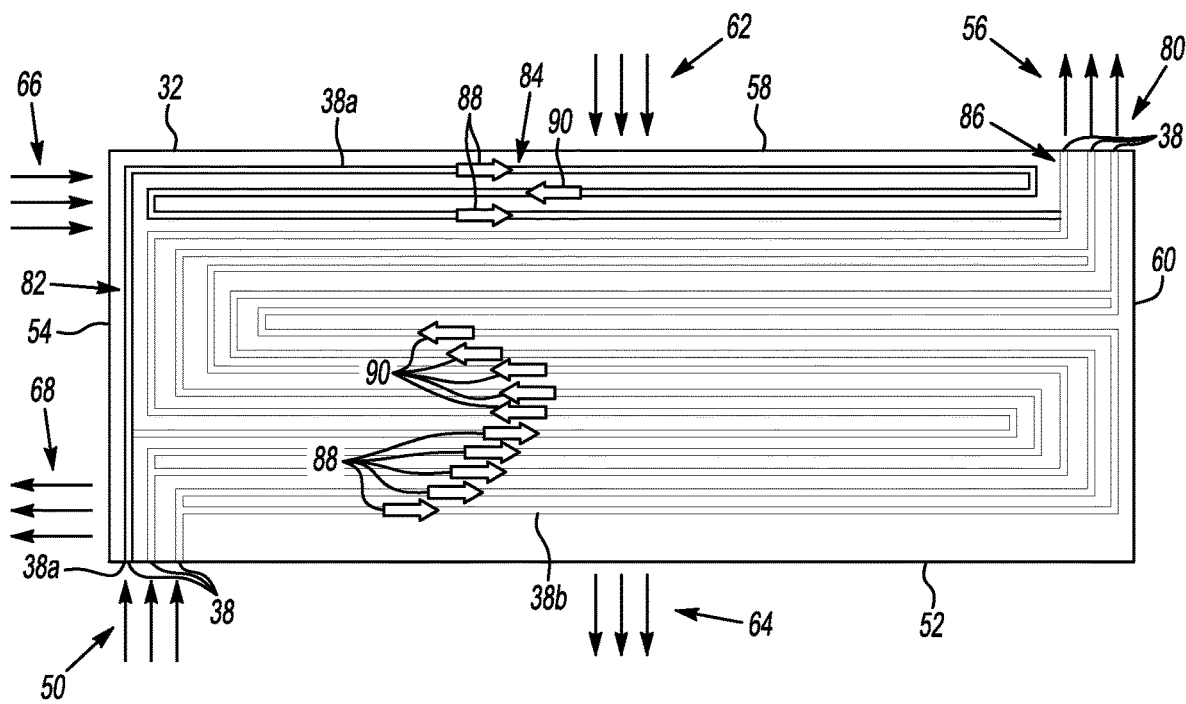
FIG. 4 illustrates an example coolant flowfield.

FIG. 4 illustrates an example coolant flowfield 80 including the coolant supply channels 38 located on the first fluid distribution plate assembly 32. The example coolant flowfield 80 includes a first coolant channel 38*a* having a first portion 82, a second portion 84, and a third portion 86.

The first portion 82 of the first coolant supply channel 38*a* extends between the coolant inlet region 50 and the second portion 84. The first portion 82 facilitates coolant flow from the coolant inlet region 50 directly toward the second portion 84. The first portion 82 includes at least one channel portion that directs the coolant flow in a single direction from the coolant inlet region 50 directly to the second portion 84. The coolant flow in the single direction is generally perpendicular to the first edge 52 of the first fluid distribution plate assembly 32, in this example.

The second portion 84 is located near the second reactant inlet region 66 and the first reactant inlet region 62 and includes a plurality of channel sections that collectively facilitate coolant flow in a plurality of directions along the second portion 84. The first direction 88 and the second direction 90 are generally parallel to the third edge 58 of the first fluid distribution plate assembly 32. The channel sections of the second portion 84 are arranged in a serpentine pattern and direct the coolant flow in a first direction 88 a plurality of times and in a second, opposite direction 90 at least once. The second portion 84 extends across substantially an entire dimension of the first fluid distribution plate assembly 32 parallel to the third edge 58 of the first fluid distribution plate assembly 32.

The channel 38*a*, and in particular the second channel portion 84, ensures that a sufficient amount of coolant reaches the portion of the fuel cell assembly 20 that includes the reactant inlet 62. That region or portion may experience high temperatures because of the configuration of the inlets 62, 66 and 50. The channel 38*a* is configured to direct coolant directly toward the second portion 84 so that the temperature of the coolant is as low as possible in that portion of the channel. The multiple passes of the coolant in the second portion 84 provides concentrated cooling in the vicinity of the reactant inlets 62 and 66.

The third portion 86 of the first coolant supply channel 38*a* extends between the second portion 84 and the coolant outlet region 56 to facilitate flow of coolant out of the first fluid distribution plate assembly 32.

The coolant flowfield 80 includes at least one second coolant supply channel 38*b* that is distinct from the first coolant supply channel 38*a*. The second coolant supply channels 38*b* direct coolant flow in a different pattern than the first coolant supply channel 38*a*. The second coolant supply channels 38*b* extend from the coolant inlet region 50 and include multiple passes in the first direction 88 and in the second direction 90. The second coolant supply channels 38*b* extend in a serpentine pattern until they eventually end at the coolant outlet region 56.

Figure 5:
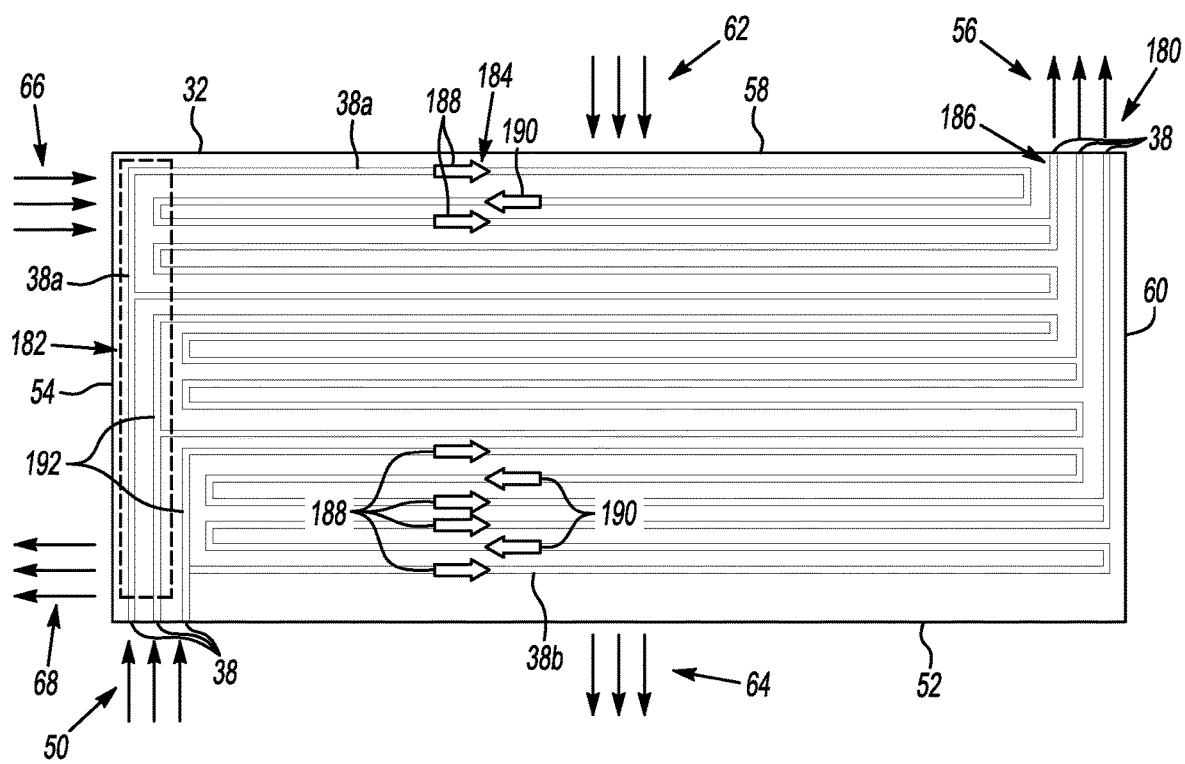
FIG. 5 illustrates another example coolant flowfield embodiment.

FIG. 5 illustrates an example coolant flowfield 180 according to another example embodiment. The first coolant supply channel 38*a* is located on the first fluid distribution plate assembly 32. The example coolant flowfield 180 includes a first portion 182, a second portion 184, and a third portion 186. The coolant flowfield 180 is symmetric so that coolant flow follows in an identical pattern whether the first fluid distribution plate assembly 32 is in the illustrated orientation or is rotated 180 degrees about a line perpendicular to the plane of plate 32 such that the coolant inlet region 50 and the coolant outlet region 56 are reversed. Since the coolant flowfield 180 is symmetric, the possibility of incorrectly installing the first fluid distribution plate assembly 32 into the fuel cell assembly 20 greatly decreases.

The first portion 182 includes a channel 38*a* having a channel portion that directs the coolant flow in a single direction from the coolant inlet region 50 directly to the second portion 184. The first portion 182 of the first coolant supply channel 38*a* directs coolant flow in a single direction generally perpendicular to the first edge 52 of the first fluid distribution plate assembly 32.

The second portion 184 is arranged in a serpentine pattern that directs the coolant flow in a first direction 188 a plurality of times along the second portion 184 and in a second opposite direction 190 at least once along the second portion 184. The second portion 184 is located adjacent the second reactant inlet region 66 and the first reactant inlet region 62 and directs coolant flow in at least two directions that are generally parallel to the first edge 52 and the third edge 58 of the first fluid distribution plate assembly 32. The coolant flow in the first portion 182 is generally perpendicular to the coolant flow the second portion 184.

The third portion 186 of the first coolant supply channel 38*a* extends between the second portion 184 and the coolant outlet region 56 to facilitate flow of coolant out of the first fluid distribution plate assembly 32.

The coolant flowfield 180 includes at least one second coolant supply channel 38*b* that is distinct from the first coolant supply channel 38*a*. The second coolant supply channels 38*b* follow a similar pattern to that of the channel 38*b*. In this example, there are two other portions 192. One of the other portions 192 is located in a central portion of the first fluid distribution plate assembly 32 and the other is located adjacent the first edge 52 of the first fluid distribution plate assembly 32.

Figure 6:
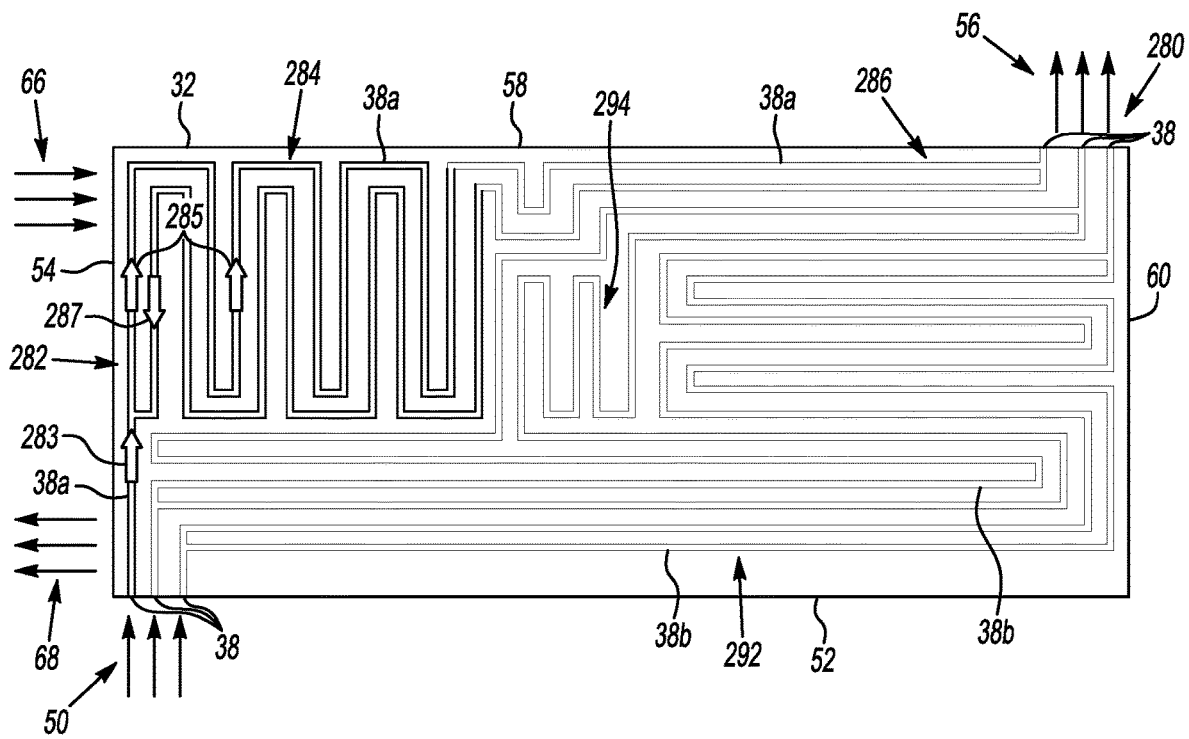
FIG. 6 illustrates another example coolant flowfield embodiment.

FIG. 6 illustrates an example coolant flowfield 280 according to another example embodiment. The first coolant supply channel 38*a* is shown on the first fluid distribution plate assembly 32. The example coolant flowfield 280 includes a first portion 282, a second portion 284, and a third portion 286.

The first portion 282 includes a single channel portion that directs the coolant flow in a single direction from the coolant inlet region 50 directly to at least one of the first coolant supply channels 38*a* of the second portion 284. The first portion 282 of the first coolant supply channel 38*a* directs coolant flow in a single direction 283 generally perpendicular to the first edge 52 of the first fluid distribution plate assembly 32.

The second portion 284 occupies approximately one quadrant of the first fluid distribution plate assembly 32 that includes a corner of the first fluid distribution plate assembly 32 that is near the second reactant inlet region 66. The first portion 282 of the coolant supply channel 38*a* directs coolant flow from the coolant inlet region 50 directly toward the corner of the first fluid distribution plate assembly 32 where the second edge 54 meets the third edge 58. The second portion 284 includes channel portions in a serpentine pattern for directing coolant flow multiple times near the inlet region 66. The coolant flows directly to the second portion 284 and flows along multiple channel portions to provide a significant portion of the cooling capacity in the vicinity of the inlet region 66.

The third portion 286 of the coolant supply channel 38*a* extends between the second portion 284 and the coolant outlet region 56 in a serpentine pattern to facilitate eventual coolant flow out of the first fluid distribution plate assembly 32. The channel portions in the third portion 286 extend generally parallel to the edge 58 of the first fluid distribution plate assembly 32 and perpendicular to the orientation of most of the channel portions of the second portion 284.

The coolant flowfield 280 includes at least one second coolant supply channel 38*b* that is distinct from the first coolant supply channel 38*a*. The second coolant supply channels 38*b* direct coolant flow in a different pattern than the first coolant supply channel 38*a*. The second coolant supply channels 38*b* include a first portion 292 that extends in a serpentine pattern adjacent the first edge 52 of the first fluid distribution plate assembly 32 and along substantially the entire length of the first fluid distribution plate assembly. The second coolant supply channels 38*b* include a second portion 294 that extends in a serpentine pattern substantially perpendicular the first portion 292 in a central region of the first fluid distribution plate assembly 32. Eventually the channels 38*b* end at the outlet 56.

The illustrated examples provide significant, concentrated cooling at the portions of the fluid distribution plates and the fuel cell assembly that may experience significant heat during fuel cell operation. The areas near the reactant inlets may be hotter than others when the coolant inlet locations and flow direction are different than those of the reactant. The illustrated coolant flowfield arrangements protect fuel cell components against localized increased temperatures that otherwise may have a negative effect on performance, durability or both.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell assembly, comprising:
a first electrode;
a second electrode;
a membrane between the first electrode and the second electrode; and
a fluid distribution plate having at least one reactant flow channel extending from a reactant inlet located at a first end of the fluid distribution plate to a reactant outlet located at the first end of the fluid distribution plate such that the reactant flow channel forms a two-pass flow pattern between the reactant inlet and the reactant outlet;
the fluid distribution plate having a coolant flow field including at least a first coolant supply channel, a second coolant supply channel, and a third coolant supply channel, the first, second, and third coolant supply channels extending from a coolant inlet located at a first side of the plate and spaced from the reactant inlet to a coolant outlet located at a second side of the plate opposite to the first side of the plate across a width of the plate, the first coolant supply channel having a first portion between the coolant inlet and a second portion near the reactant inlet, the first portion facilitating coolant flow from the coolant inlet directly toward the second portion, the second portion comprising a plurality of channel sections that collectively facilitate coolant flow in a plurality of directions along the second portion near the reactant inlet, the first coolant supply channel having a third portion between the second portion and the coolant outlet, the first coolant supply channel extending in a first serpentine pattern adjacent to the second side of the plate near the reactant inlet, the second coolant supply channel extending in a second serpentine pattern adjacent to the first side of the plate, and the third coolant supply channel extending in a third serpentine pattern at a middle region of the plate between the first serpentine pattern and the second serpentine pattern;
wherein the first, second, and third serpentine patterns extend back and forth between opposing ends of the plate across a length of the plate perpendicular to the width of the plate; and
wherein the coolant flow field is rotationally symmetric about a line perpendicular to a major surface of the fluid distribution plate.

2. The fuel cell assembly of claim 1, wherein the first portion has a single channel portion that directs the coolant flow in a single direction from the coolant inlet directly to a first one of the channel sections of the second portion.

3. The fuel cell assembly of claim 1, wherein the fluid distribution plate comprises a porous water transport plate.

4. The fuel cell assembly of claim 3, wherein the water transport plate is micro-porous and hydrophilic.

5. The fuel cell assembly of claim 1 wherein the width of the plate is shorter than the length of the plate.

6. The fuel cell assembly of claim 1 wherein the first, second, and third coolant supply channels enter the plate in a direction extending away from the first side of the plate toward the second side of the plate.

7. The fuel cell assembly of claim 1 wherein the reactant flow channel is a cathode reactant flow channel.

8. The fuel cell assembly of claim 1 wherein the reactant inlet is coupled to a source of oxygen.

9. The fuel cell assembly of claim 1 wherein the fluid distribution plate is a first fluid distribution plate, the reactant flow channel is a first reactant flow channel, the reactant inlet is a first reactant inlet, and the reactant outlet is a first reactant outlet, and the fuel cell assembly further comprises a second fluid distribution plate having a second reactant flow channel extending from a second reactant inlet located at a first side of the second fluid distribution plate corresponding to the first side of the first fluid distribution plate to a second reactant outlet located at the first side of the second fluid distribution plate corresponding to the first side of the first fluid distribution plate such that the second reactant flow channel forms a two-pass flow pattern between the second reactant inlet and the second reactant outlet.

* * * * *